United States Patent [19]

Declercq

[11] 4,373,567
[45] Feb. 15, 1983

[54] TIRE RIM AND ADAPTER

[75] Inventor: Pierre J. R. Declercq, Gilsdorf, Luxembourg

[73] Assignee: The Goodyear Tire & Rubber Company, Akron, Ohio

[21] Appl. No.: 196,727

[22] Filed: Oct. 10, 1980

[51] Int. Cl.³ ............... B60B 21/10; B60B 25/08
[52] U.S. Cl. ...................... 152/405; 152/379.3; 152/381.3
[58] Field of Search ............ 152/362 R, 362 CS, 363, 152/365–366, 375, 378, 379.3, 381.3, 381.4, 381.5, 381.6, 396, 402–405, 411, DIG. 9; 301/35 R, 95–98

[56] References Cited

U.S. PATENT DOCUMENTS

| 770,611 | 9/1904 | Scott | 152/396 |
| 848,017 | 3/1907 | Ebner | 152/366 X |
| 1,418,623 | 6/1922 | Coe | 152/396 |

FOREIGN PATENT DOCUMENTS

| 2414885 | 11/1975 | Fed. Rep. of Germany. | |
| 2452306 | 5/1976 | Fed. Rep. of Germany. | |
| 2456419 | 8/1976 | Fed. Rep. of Germany | 152/381.3 |
| 2514883 | 10/1976 | Fed. Rep. of Germany | 152/379.3 |
| 630141 | 10/1949 | United Kingdom | 152/381.3 |

Primary Examiner—Charles A. Marmor
Attorney, Agent, or Firm—L. R. Drayer

[57] ABSTRACT

Adapters mounted between the beads of a tire and the respective bead seats of a standard rim to permit the mounting of oversize tires on standard rims. A first surface on an adapter is contoured to conform to and engage a respective rim bead seat and flange. A second surface on an adapter is contoured to conform to and engage a respective tire bead. The adapter may comprise an annular body, a pair of cores in the annular body, and a reinforcing ply enveloping the pair of cores.

13 Claims, 4 Drawing Figures

TIRE RIM AND ADAPTER

The present invention relates to adapting tires to rims and more particularly to tire-to-rim adapters positioned between beads of a tire and corresponding bead seats of a rim.

It has been previously known to overcome single piece metal tire rim mounting and demounting problems by modifying the rims to make them multi-piece. Multi-piece rims have removable flanges to aid in the mounting and removal of a tire. With the flange removed, the tire can easily be slipped on the rim, whereas it otherwise has to be forced over the flange. Metal rims can also have one flange which is removable and which consists of an annular elastomer member. Rims have even been made with modifications to them for receiving adapters whereby an otherwise single piece rim can accept the adapter which is removable and provides, in addition to the flange, a bead seat on one side of the rim which is symmetrical to that of the fixed flange on the other side of the rim. Another known metal rim modification is to reduce the rim diameter at the bead seats to permit introduction of elastomer material, in the recess thus formed, which elastomer in turn provides the bead seat for the tire mounted on the rim. Such a modification provides vibration dampening between tire and rim, but neither this embodiment nor the modified single piece rims using adapters in place of fixed rims provide for placement of tires on rims which tires have bead diameters larger than those of the bead seat diameters of the smaller rims on which the tires are to be placed. Further, single piece inserts of elastomer material for adapting smaller rigid rims to larger tires by increasing the bead seat diameter are also known. The single piece insert, however, also has rim flange extensions which make it as difficult to mount the tire thereon as the old single piece metal rims, if not more difficult. There is an increased coefficient of friction for elastomer contact when using the insert in comparison to elastomer to hard surface contact for either a metal or rigid rim. The single piece insert is not easily removable and does not provide a deeper drop-center well to compensate for the tire mounting and dismounting difficulties.

The present invention is directed at adapting tires to rims and more particularly to a tire to rim adapter which overcomes the above problems by modifying the adapter to both rim and tire so that no modification is necessary to the rim. Another advantage is the provision of a deeper drop-center well which provides easier mounting and dismounting of the tire perhaps in some cases without the use of the mounting and dismounting equipment which has been commonly used. On the other hand, if desired, an adapter can be displaced from its seating surface on the standard rim for easy mounting and dismounting of the tire.

One form of this invention provides a three-piece tire rim having a standard rim with a pair of flanges and bead seats on opposite sides respectively of the standard rim. The standard rim is adapted for receiving tires having beads with heel portions and bead diameters larger than the diameter of the rim bead seats. A pair of adapters, mountable independently of one another on respective rim bead seats, accommodate the larger tire on the smaller rim. Each adapter comprises an annular body having a first surface contoured to conform to and engage the respective rim flange and bead seat. A second surface includes a bead seat on the adapter which is located radially outwardly from the respective rim bead seat, when the adapter is mounted on the rim, a distance sufficient to locate the adapter bead seat in a position at least partially above both rim flanges for interfacing with the tire bead. The second surface is contoured to conform to and engage the tire bead to support and seal the tire bead on the adapter bead seat. The second surface further extends in a generally radial direction from the adapter bead seat to provide axial support for at least the heel portion of the tire bead extending above the rim flange.

This invention also provides an adapter with an auxiliary bead seat between a rim having a bead seat and a flange which extends generally radially outwardly therefrom and a tire having a bead core within its bead which has a radially inner seating surface and a surface which extends generally radially outwardly therefrom. The diameter of the radially inner seating surface of the tire bead is substantially greater in diameter than that of the bead seat. The adapter comprises an annular body having a first surface which is contoured to conform to and is engaged with the respective flange and bead seat of the rim and a second surface providing the auxiliary bead seat and which is contoured to conform to and is engaged with the seating surface of the respective bead of the tire. A pair of annular cores are disposed within the annular body and at least one reinforcing ply envelopes the pair of cores in the annular body. The cores in the annular body are spaced apart in a direction perpendicular to the axis a distance which is greater than the distance which they are spaced apart in a direction parallel to the axis. The radially outer core of the cores in the annular body is disposed at least in part radially outwardly of the respectively associated bead core in the tire. The radially inner core of the cores in the annular body is disposed at least in part in overlapping relationship to the respectively associated bead core in the tire in a direction parallel to the axis.

The present invention also provides an adapter and a standard rim with the rim having a pair of bead seats on opposite sides respectively thereof extending generally parallel to the rotational axis thereof. Each bead seat terminates at a flange which extends generally radially outwardly therefrom for use with a tire having a bead which has a radially inner seating surface and a surface which extends generally radially outwardly therefrom. The diameter of the radially inner seating surface of the bead is substantially greater than the diameter of the associated bead seat on the rim. The adapter is engaged between the bead and bead seat and comprises an annular body having a first surface which is contoured to conform to and is engaged with the bead seat and flange of the rim. A second surface is contoured to conform to and engage with the surfaces of the tire bead. The annular body further comprises a pair of annular cores disposed within the annular body. The cores are spaced apart in a direction perpendicular to the axis a distance which is greater than the distance which they are spaced apart in a direction parallel to said axis.

In another aspect of this invention, a retainer comprising a raised portion of the rim adjacent and at least partially axially outwardly of the adapter is provided to retain the axial position of the adapter on the rim.

Referring to the figures.

Figure 1:
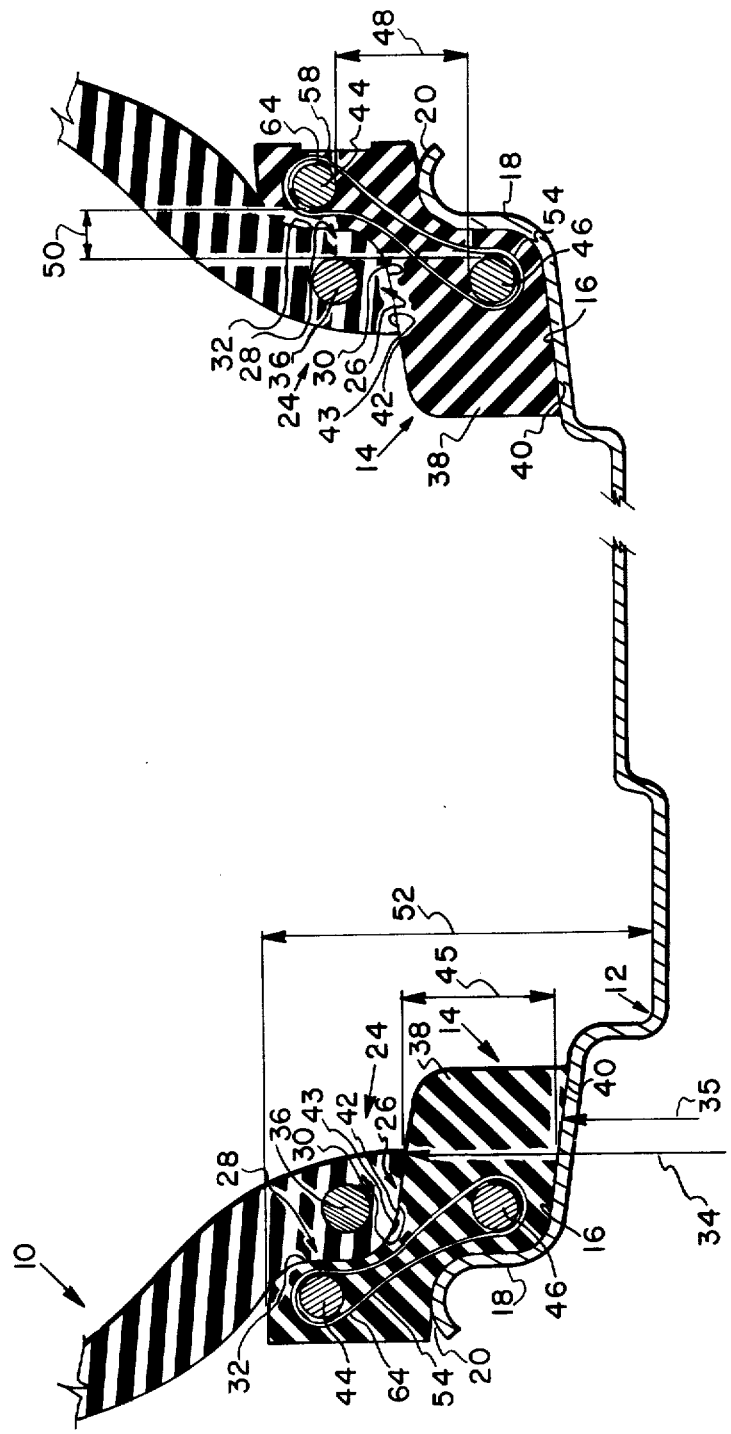
FIG. 1 is a partial cross-sectional view taken in a radial plane of a tire, rim, and a pair of adapters in accordance with the present invention.

In FIG. 1, there is shown a tire 10, a rim 12, and a pair of adapters 14. The rim 12 is an annular member which provides support for a tire for rotational movement thereof and has a rotational axis, the rotational axis being the axis about which the rim rotates during normal use thereof. A pair of bead seats 16 are provided toward the axially outer edges or sides of the rim 12 and normally engage the beads of a tire for mounting of a tire on the rim 12. These bead seats 16 extend generally parallel to the rotational axis of the rim 12. By this, it is meant that the bead seats 16 may extend at a small angle relative to the rotational axis of the rim 12 of up to approximately 15 degrees. In addition, the extension of the bead seats 16 generally parallel to the rotational axis of the rim 12, may be interrupted by recesses or bumps, and the like. Each bead seat 16 terminates at a flange 18 which is conventionally disposed generally axially outwardly of and which extends generally radially outwardly from the respective bead seats 16. By this, it is meant that the flange 18 may extend at an angle relative to the rotational axis of the rim 12 of between 45 and 135 degrees and may have recesses or bumps, and the like. Each flange 18 terminates at a surface 20 which is located radially outwardly from the respective bead seat 16 and which extends generally parallel to or toward the rotational axis of the rim 12. The bead seats 16 have substantially the same predetermined diameter.

The terms "radial" and "radially", as used herein, refer to a direction generally perpendicular to the rotational axis of the rim 12. The terms "axial" and "axially", as used herein, refer to a direction generally parallel to the rotational axis of the rim 12. A radial plane is one which contains the rotational axis of the rim 12. Unless otherwise specified a reference herein to an item being above another item will mean that the item is located radially outwardly of the other item.

The rim 12 is normally metal, but can be of other rigid materials, and may be a standard rim preselected for use with the tire 10 even though the tire 10 is not of a size which normally fits the rim 12. Therefore, the invention is suitable for adapting standard rims to oversize tires; that is, tires which have tire beads with heel portions and bead diameters larger than the diameter of the rim bead seats 16.

The tire 10 has a pair of annular bead portions 24. Each bead 24 has a sole portion 26 and a heel portion 28 which provide an axially extending seating surface 30 and radially extending surface 32, respectively. Seating surface 32 extends generally radially outwardly from surface 30. The seating surfaces 30 of the bead portions 24 have substantially the same diameter with the diameter 34 of the bead portions 24 being greater than the diameter 35 of the bead seat 16 of the rim 12. The tire 10 may be preselected and is not limited to any particular type of tire. An inextensible bead core, preferably circular, such as bead wire 36, is disposed within each bead portion 24.

An adapter 14 is engaged between each bead seat 16 and a respective bead portion 24. The adapter 14 comprises an annular body 38 which has a first surface 40 contoured to conform to and which is engaged with the respective bead seat 16 and flange 18 of the rim 12. It has a second surface 42 which is contoured to conform to and is engaged with the surfaces 30 and 32 of the respective bead portion 24 of the tire 10 and thereby provides a bead seat 43 on the adapter to support and seal the tire bead 24 thereon.

The adapter bead seat 43 is located radially outwardly from the rim bead seat 16, when the adapter 14 is mounted on the rim 12, a distance 45 which is sufficient to locate the adapter bead seat 43 in a position at least partially above both rim flanges 18 for interfacing with the respective tire bead 24. The second surface 42 also extends in a generally radial direction from the adapter bead seat 43 to provide axial support for at least the heel portion 28 of the tire bead 24 extending above the rim flange 18.

When mounted on the rim 12, the adapters 14 are spaced apart as shown in FIG. 1. This results in an increased drop center depth as indicated at 52 for mounting and dismounting tires. In other words, the drop center depth 52 is increased by an amount equal to the distance 45 in a radial direction between the rim bead seat 16 and the bead seat 43 on the adapter 14.

Each adapter 14 is mountable on the respective rim bead seat 16 independently of the other, thereby resulting in easy mounting and dismounting of the adapters.

A pair of annular cores, preferably circular, but which can have other shapes, such as bead wires 44 and 46, are disposed within the annular body 38 and are spaced apart in a direction perpendicular to the rotational axis of the rim a distance 48 which is greater than the distance 50 which they are spaced apart in a direction parallel to the axis.

The radially outermost bead wire 44 of the bead wires 44 and 46 in the annular body 38 is further positioned at least in part radially outwardly of the respectively associated bead wire 36 in the tire 10. Preferably, the radially outermost bead wire 44 partially overlaps the respectively associated bead wire 36 in the tire 10. This bead wire 44 is also preferably positioned radially outwardly of the respectively associated flange 18.

The radially inner bead wire 46 of the beads in the annular body 38 is disposed in overlapping relationship to the respectively associated bead wire 36 in the tire 10 in the axial direction. The bead wire 46 is at least partially disposed radially inwardly of the surface 20 at which the respectively associated flange 18 terminates.

At least one reinforcing ply 54, preferably of cords 64 impregnated with elastomeric material, envelopes the bead wires 44 and 46 in the annular body 38. The cords 64 in the ply 54 extend generally parallel to each other and are preferably radial cords; that is, they are disposed to lie substantially in a radial plane of the rim 12. Other reinforcing plies, such as two layers of bias ply material, could be used. The remainder of the annular body 38 preferably generally comprises elastomeric material such as rubber or urethane.

With the tire bead wire 36 being above the rim flange 18, as shown in FIG. 1, all axial support for the tire bead 24 is provided by the adapter 14, and more particularly, the bead wires 44 and 46 coupled by the reinforcement 54.

The annular body 38 may include an axially outer surface 58 thereof which may be used for displaying a design, such as a white band similar to a white sidewall band of a conventional tire or other indicia.

Figure 2:
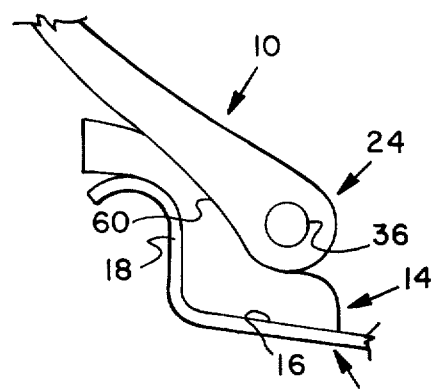
FIG. 2 is a schematic view of a partial cross-section similar to FIG. 1 showing accommodation of a particular shape of tire bead.

In FIG. 2, the adapter 14 is illustrated with a shape to match the particular contour of the tire bead 24 at 60 to permit use of the tire without modification of the rim 12. Similarly, the adapter 14 may be modified to accommodate a variance in tire shape without changing the rim 12.

Figure 3:
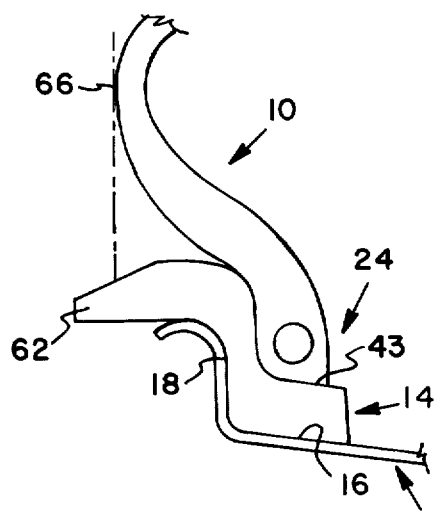
FIG. 3 is a schematic view similar to FIG. 2 showing an adapter modified to provide scuff protection of a tire.
Figure 4:
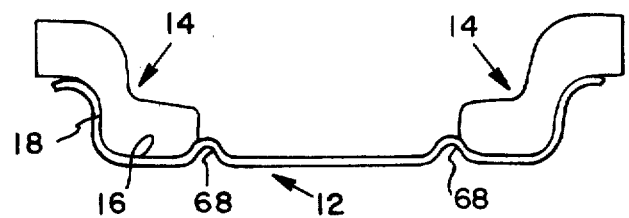
FIG. 4 is another schematic view similar to FIG. 2, illustrating a means of retention of an adapter on a rim.

FIG. 3 illustrates another version of the adapter 14 which is provided with a portion 62 extending axially outwardly past the axially outermost point 66 of the tire 10 to provide scuff protection of the tire on one side thereof.

Where desired, the rim 12 may be modified to provide additional axial retention of the adapter 14 by a retainer such as the raised portion 68 of the rim 12 shown in FIG. 4 adjacent and at least partially axially inwardly of the adapter 14.

Further uses of the adapter 14 can be envisioned. For example, it can be used to adapt an asymmetric bead diameter tire to a standard rim and to beneficially adjust wheel camber effect, just to mention a few applications.

With the use of a pair of adapters 14 as described herein, a tire which may not otherwise be mountable on a particular preselected rim may now be mounted on such a rim.

While certain representative embodiments and details have been shown for the purpose of illustrating the invention, it will be apparent to those skilled in the art that various changes and modifications may be made therein without departing from the spirit and scope of the invention.

What is claimed is:

1. An adapter for adapting a rim to a tire having a bead diameter larger than the diameter of the rim bead seats, said rim having a bead seat extending generally parallel to the rotational axis of the rim and a flange which extends generally radially outwardly therefrom to normally engage the bead portions of a tire for mounting of a tire on the rim, and a tire having a bead core in a bead portion which has a radially inner seating surface and a surface which extends generally radially outwardly therefrom, the diameter of the radially inner seating surface of the bead portion of the tire being greater than that of the rim bead seat, said adapter comprising an annular body having a first surface which is contoured to conform to and engage the respective flange and bead seat of the rim, and a second surface having a bead seat which is contoured to conform to and engage the seating surface of the respective bead of the tire, and thereby provides a bead seat on the adapter located radially outwardly from the rim bead seat, when the adapter is mounted on the rim, a distance which is sufficient to locate the adapter bead seat at least partly radially outwardly of said rim flange, a pair of annular cores disposed within said annular body, and at least one reinforcing ply enveloping said pair of cores in said annular body, said cores in said annular body being spaced apart in a direction perpendicular to said axis a distance which is greater than the distance which they are spaced apart in a direction parallel to said axis, the radially outer core of said cores in said annular body being disposed at least in part radially outwardly of the respectively associated bead core in the tire, the radially inner core of said cores in said annular body being disposed at least in part in overlapping relationship to the respectively associated bead core in the tire in a direction parallel to said axis.

2. A rim and an adaptor for adapting said rim to a tire having a bead diameter larger than the diameter of the rim bead seats, said rim being provided with a pair of bead seats toward the axially outer edges of the rim which normally engage the bead portions of a tire for mounting of a tire on the rim, each said bead seat terminating at a flange which is disposed generally axially outwardly of and which extends generally radially outwardly from the respective bead seat, said adapter being engaged between said bead seat and a bead portion of a tire, said bead portion having a radially inner seating surface and a surface which extends generally radially outwardly therefrom, a bead core being disposed within said bead portion, the diameter of the radially inner seating surface of said bead portion being greater than the diameter of the bead seat of said rim, said adapter comprising an annular body having a first surface which is contoured to conform to and is engaged with a bead seat and flange of said rim, and a second surface which is contoured to engage with said surfaces of the bead portion of said tire, and thereby provides a bead seat on the adapter located radially outwardly from the rim bead seat a distance which is sufficient to locate the adapter bead seat at least partly radially outwardly of said rim flange, the annular body of said adapter further comprising a pair of annular cores disposed within said annular body, said cores being spaced apart in a direction perpendicular to the rotational axis of said rim a distance which is greater than the distance said cores are spaced apart in a direction parallel to said axis.

3. Apparatus according to claim 1 or 2, wherein the axially outermost point of the radially inner core of the cores in said annular body is located axially outwardly of the respectively associated bead core in the tire.

4. Apparatus according to claim 1, wherein said reinforcing ply comprises a plurality of generally parallel cords each of which is disposed to lie substantially in a radial plane.

5. Apparatus according to claim 2, wherein the radially inner core of said cores in said annular body is disposed at least in part in overlapping relationship to said bead core in the tire in a direction parallel to said axis.

6. Apparatus according to claim 1 or 2, wherein said rim includes a retainer for retaining the axial position of said adapters on said rim.

7. An adapter and rim, said rim having a bead seat and flange which normally engage the bead portion of a tire for mounting of a tire on said rim, said adapter and rim being useable with a tire having a bead portion which has a radially inner seating surface and a surface which extends generally radially outwardly therefrom, the diameter of the radially inner seating surface of the bead portion of the tire being substantially greater than the diameter of the bead seat of the rim, said adapter being engaged between the bead portion of said tire and bead seat of said rim and comprising an annular body having a first surface which is contoured to conform to and engage said bead seat and flange of said rim, and a second surface which is contoured to conform to and engage said surfaces of the bead portion of the tire, and thereby provides a bead seat on the adapter located radially outwardly from the rim bead seat a distance which is sufficient to locate the adapter bead seat at least partly radially outwardly of said rim flange, said rim further comprising a retainer for retaining the axial position of said adapter on said rim, said retainer including a raised portion of said rim adjacent and at least partially axially inwardly of said adapter.

8. The assembly of a rim, a tire and a pair of adapters for adapting said rim to a tire having a bead diameter larger than the diameter of the rim bead seats, said assembly comprising:
  (a) a rim provided with a pair of bead seats toward the axially outer edges of the rim which normally engage the bead portions of a tire for mounting of a tire on the rim, each said bead seat terminating at a flange which is disposed generally axially outwardly of and which extends generally radially outwardly from the respective bead seat;
  (b) a tire having a pair of annular bead portions, each bead portion having a radially inner seating surface and a surface which extends generally radially outwardly therefrom, each bead portion having a bead core disposed therein, the diameter of the radially inner seating surfaces of said bead portions being greater than the diameter of the bead seats of said rim; and
  (c) a pair of adapters, one of said adapters being engaged between each bead seat of said rim and the respective bead portion of said tire, such that said tire which may not otherwise be mountable on said rim is mounted on said rim, each said adapter comprising an annular body having a first surface which is contoured to conform to and is engaged with a bead seat and flange of said rim, and a second surface which is contoured to conform to and is engaged with said surfaces of the bead portion of said tire and thereby provides a bead seat on the adapter located radially outwardly from the rim bead seat a distance which is sufficient to locate the adapter bead seat at least partly radially outwardly of said rim flanges, the annular body of each adapter further comprising a pair of annular cores disposed within said annular body, said annular cores being spaced apart in a direction perpendicular to the rotational axis of said rim a distance which is greater than the distance said cores are spaced apart in a direction parallel to said axis.

9. The assembly of claim 8, wherein the axially outermost point of the radially inner core of the cores in the annular body of each said adapter is located axially outwardly of the bead core in the respectively associated bead portion of said tire.

10. The assembly of claim 8, wherein the radially inner core of the cores in the annular body of each said adapter is disposed at least in part in overlapping relationship to the bead core in the respectively associated bead portion of said tire in a direction parallel to said axis.

11. The assembly of any of claims 8, 9 or 10 wherein each said adapter further comprises a reinforcing ply, said reinforcing ply comprising a plurality of generally parallel cords, each of said cords being disposed to lie substantially in a radial plane.

12. The assembly of any of claims 8, 9 or 10 wherein said rim further comprises a retainer for retaining the axial position of said adapters with respect to said rim, said retainer including a raised portion of said rim adjacent and at least partially axially inwardly of each said adapter.

13. The assembly of claim 11, wherein said rim further comprises a retainer for retaining the axial position of said adapters with respect to said rim, said retainer including a raised portion of said rim adjacent and at least partially axially inwardly of each said adapter.

* * * * *